United States Patent Office 3,479,285
Patented Nov. 18, 1969

3,479,285
FOAM PRODUCING MATERIALS AND METHOD FOR ATMOSPHERE CONTROL WITH HIGH EXPANSION FOAM
Gerald L. Barthauer, Bridgeville, Pa., assignor to Safety Development Corporation, Greensburg, Pa., a corporation of Ohio
No Drawing. Continuation of application Ser. No. 448,906, Mar. 29, 1965. This application Oct. 31, 1966, Ser. No. 591,031
Int. Cl. A62d 1/00; A62c 1/12
U.S. Cl. 252—3
14 Claims

ABSTRACT OF THE DISCLOSURE

Foam producing liquid concentrates are described which comprise a water soluble alkoxylated alkyl sulfate salt, a $C_{12}$ to $C_{16}$ alcohol and preferably a water soluble solvent which is chemically inert to the components of the composition. These compositions when mixed with either fresh or salt water produce a high expansion foam having outstanding water-retentiveness, stability and mobility which is useful with an appropriate apparatus for fighting fires, decontamination operations and the like.

This invention relates to improved foam producing materials which is usable for generating foam for atmosphere control in fire fighting, decontaminating operations and the like. These are two example applications of the present invention which require a "wet" foam material that must retain a satisfactory water content for a considerable length of time.

The present application is a continuation of my copending application Ser. No. 448,906, filed Mar. 29, 1965, now abandoned, and a continuation-in-part of my copending application Ser. No. 158,556, filed Dec. 11, 1961, now U.S. Patent 3,186,943 and contains subject matter common with copending continuations-in-part applications Ser. Nos. 417,481 and 420,484, filed Dec. 10, 1964, both abandoned. Copending application, Ser. No. 158,-556, discloses methods and compositions useful with an appropriate apparatus for generating a fire-extinguishing high-expansion foam.

In previously filed copending application Ser. No. 13,103, entitled "Fire-Fighting Foam Generator" and filed Mar. 7, 1960 in the name of Will B. Jamison, there is disclosed a suitable apparatus for generating water-containing foam material having sufficient mobility and generated in sufficient quantity and rate to provide an effective control over fires of various kinds including mine fires, petroleum field fires and the like which must be brought under control from a distance. It has been found, that the apparatus and method disclosed in the referenced copending application, has added importantly in the field of fire control and the present invention proposes a new and improved foam-producing material which is especially usable with said apparatus to provide an improved foam having more effective fire-fighting qualities.

It has been found that foam, in order to be effective in combating fires, must have a water content sufficient to effect a smothering action on the fire. This does not mean that the foam material "wets" the fire, but rather that sufficient water accompanies the foam so that it will vaporize, forming a blanket of steam which, in turn, is confined by the foam in the vicinity of the fire, to deprive the fire of the necessary amount of oxygen to sustain combustion. Should the foam material lack sufficient water content, it is less effective and it will therefore not function as satisfactory in controlling the fire.

Accordingly, it is an object of the invention to provide a foam-producing material having an addition thereto which renders the foam more water retentive so that it not only is generated with sufficient water, but the foam will also retain an adequate water content for the time period during which it travels from the foam generator to the site of the fire. That is, the drainage rate of water from the foam is impeded with the result that the foam-generating apparatus can be located a safe distance away from the fire where the foam is generated, and as the foam advances to the site of the fire, it will retain a sufficient moisture content to be effective at the time it reaches the fire.

The terminology used throughout the specification is essentially that described in Underwriter's Laboratories, Inc. UL 162, "Air-Foam Equipment and Liquid Concentrates," First edition, May 1960. The following terms are defined as follows:

Air-foam liquid concentrate—a highly concentrated foaming agent.
Air-foam solution—a mixture of an air-foam liquid concentrate, in suitable proportions, with either fresh or salt (sea) water. Not necessarily a true solution as a trace of highly insoluble aliphatic alcohols usually give a hazy appearance to the air-foam solution.
Air foam—a fire-fighting foam made by mixing air with a solution of fresh or salt (sea) water to which a foaming agent (air-foam liquid concentrate) has been added.

Air-foam solution made from air liquid concentrates, e.g. hydrolyzed protein materials, having a low expansion ratio are generally available and when added to water in 3%–6% concentration produce a volumetric increase of about 10/1 to 20/1 when converted from liquid phase to foam material. These same previously used materials are not suitable however for much larger expansion ratios in the order of 50/1 to 2000/1 either because of fragility, inadequate water content, excessive drainage rate, unsatisfactory viscosity or the like. It is an important feature of the present invention that the air-foam solution (this term being used throughout the specification in the sense defined by Underwriters' Laboratories, Inc., UL 162— 1st ed., May 1960 as being a material "as a mixture of an air-foam liquid concentrate in suitable proportions" in water) is capable of usage both as a high expansion and low expansion foam producing material depending upon the foam-generating equipment. In all cases the air foam solution is derived from volumetric dilution of foam liquid concentrate. This is an important advantage to fire fighting personnel who need stock only the single material which can be used with either kind of equipment for producing a particular kind of foam.

Low expansion foam can be produced, using an ordinary foam water spray nozzle as illustrated on page 25 of the aforesaid publication, "Air-Foam Equipment and Liquid Concentrates."

It should be understood that the requirements of a high expansion foam are more rigorous and technically more difficult to attain than low expansion foams. It forms an important feature of the present invention that the foam-generating material can meet all of the requirements of a high expansion foam and additionally is usable in equipment which will generate foams of lower expansion ratios which are useful for other fire-fighting applications.

A further object of the invention is to provide an air-foam solution which will produce a foam of appropriate average size and which combines, when used in either high or low expansion ratio foams, the requisite properties of stability, mobility, i.e., lightness to enable propulsion, and adequate moisture content. To accomplish these functional requirements, the foam size must be capable of generation in small sizes to produce an emulsion in which case it has high water content but is less easily transported. At the same time, the foam can be made of larger size by other equipment which produces a foam material of less moisture content and characterized by a light billowy construction more readily transported by draft forces and the like. It is therefore an object of the invention to provide a foam-generating material which will produce a suitable size range foam, adapted to a particular fire condition by the selected apparatus. For best results the foam will necessarily vary to meet the particular need.

Another object of the invention, is to produce a foam agent which is capable of producing a foam material having a high expansion ratio in the order of about 50–2000 to 1, meaning that the air-foam liquid concentrate will, after it is combined with water and is air blown in the proper manner, produce a foam material having 50–2000 times the volume of the air-foam solution. The air-foam solution has the further ability, to produce foam very rapidly and with any hardness water ranging from zero hardness to sea water having many thousand parts per million hardness.

Another object of the invention, is to provide air-foam solution which is usable with water of varying hardness content, and is capable of producing foam with water ranging in hardness even as high as sea water. This means, that by reason of the present invention, it is possible to generate foam at an acceptable rate, appropriate size, mobility, expansion ratio and water content using water of substantial hardness range extending upwardly in hardness to sea water. Consequently, my invention is readily adapted for maritime use since sea water can be used as the water medium for producing the foam. The present invention, has also made it possible to combine with the foam-producing material an ingredient making foam (regardless of the hardness content), water retentive, so that the foam will have sufficient water content at the time that it reaches the site of the fire to produce its smothering effect.

The manifold difficulties of generating satisfactory high-expansion foam in very high hardness waters is outlined in United States Bureau of Mines Report of Investigation 5632, "Controlling Mine Fires with High Expansion Foam" (1960), in which it is stated—"Water having a hardness of less than 500 p.p.m. should be used. If the hardness is greater than 500 p.p.m., the water should be treated chemically. As the type of mineral and degree of hardness will vary at each mine, individual analysis and treatment should be considered."

A specific object of the invention is to provide air-foam liquid concentrates which are useful in producing an air foam having a high-expansion ratio in the order of about 50/1 to 2000/1. The air-foam liquid concentrates are useful with any hardness water, ranging from zero hardness to sea water hardness of many thousand parts per million. Additionally, materials can be incorporated in the air-foam liquid concentrate composition which will impede drainage of water from the foam during its transport from the foam-generating equipment to the site of the fire. Other materials can be incorporated in the air-foam liquid concentrate which will permit outside storage during cold weather and still maintain the concentrate in a fluid condition, instantly available for use if needed.

Another specific object of the invention is to provide air-foam solutions which can be prepared with water of varying hardness content, ranging from zero hardness to sea water hardness, which, when air-blown in the proper manner, are capable of producing air foam having 50–2000 times the volume of the air-foam solution. It is also possible to combine with the foam-producing material, an ingredient making foam (regardless of the water content) highly water-retentive, so that foam will have sufficient water content at the time it reaches the site of the fire to produce its smothering effect.

Still another specific object of the invention is to provide methods for producing water-retentive high-expansion foams of the order of 50/1 to 2000/1 expansion ratio with waters ranging in hardness from zero hardness to sea water hardness.

An overall object of the present invention, is to enlarge the scope of use of a fire-fighting apparatus disclosed in previously-filed application Ser. No. 13,103 by making it possible to utilize water of a substantial variation in hardness, ranging from no hardness, to sea water hardness, so that virtually any water supply is suitable for generating the foam. As a result, it is possible to obtain a fire-fighting foam with all of its inherent advantages over conventional processes which can be produced with any municipal or maritime water source; consequently, more people and property can be safeguarded by this invention. Among the advantages which are now made more generally available include: less damage to the area under fire control, greater safety to persons in the vicinity of the fire, improved fire fighting in inaccessible areas and fire fighting from safer distances.

In addition to these foregoing objects it is also intended to produce a foam material which can decontaminate enclosures by removing airborne radioactive particles by aspirating the volume of air into bubbles where the radioactive material is entrapped within bubbles for a sufficient period effecting eventual "wetting" thereof. Thus, when the bubbles burst or drain, the wetted contaminants accompany the liquid phase and are carried down to the floor of the enclosure and are thereby removed, virtually completely, from airborne dispersion to a surface collection which can be washed easily away.

Other objects and features of the present invention, will become apparent from a consideration of the following description, wherein a plurality of selected example embodiments of the invention have been chosen for illustrative purposes.

Foam generation with hard and soft water

When soft water, i.e., low hardness water is used, it is less difficult to generate foam and such foaming agents as ammonium lauryl sulfate are usable for producing both high and low volume expansion ratio foams. To provide an adequate water retentiveness to the foam it is necessary to include with the foaming agent, an alcohol such as lauryl alcohol which increases both the strength and viscosity of the bubble wall and improves thereby its functionality.

The ammonium lauryl sulfate is suitable however only with relatively low hardness water and the lauryl alcohol while improving water retentiveness has no apparent affect on the ammonium lauryl sulfate's inability to generate foam in high hardness water.

To generate foam with high hardness or low hardness water to produce either low or high volume expansion foam I use an alkoxylated ammonium alkyl sulfate wherein the alkyl group consists of a $C_{10}$–$C_{20}$ straight or branched chain-nucleus and the alkoxylation is effected by ethylene oxide, propylene ethoxide or the like. Evidence indicates that there are multiple units of alkoxylation in the molecule to provide a general formula:

$$[R-(O-R')_n-SO_4]NH_4$$

where $n = 1$ to $4$
$R = C_{10}$–$C_{20}$ alcohol derivative
$R' =$ ethylene, propylene nucleus and the like In addition to the ammonium salts, other salts of alkoxylated alcoholic sulfates are useful such as those obtained from the alkali, the alkaline earth metals, or the organic amine salts such as mono, di, or tri, ethanolamine salts, etc.

These materials are also known in the trade as the salts of alkyl ether sulfates where the cation, the degree of alkoxylation, and the alkyl groups are normally specified. For example, the foaming agent having the formula $$[CH_3(CH_2)_{10}CH_2—(OCH_2CH_2)_nSO_4]NH_4$$

would be the ammonium salt of lauryl ether sulfate. If "$n$" averaged "4," the salt can be described as the "ammonium lauryl ether sulfate of 4 moles of ethylene oxide with one mole of lauryl alcohol."

Foaming agents of the type described above can be prepared by alkoxylating $C_{10}$– to $C_{20}$ alcohol, sulfating the alkoxylated alcohol in various manners to form the alkyl ether sulfuric ester and finally neutralizing the ester with a basic material of choice. As an example, the aforesaid "ammonium lauryl ether sulfate of 4 moles of ethylene oxide with 1 mole of lauryl alcohol" can be prepared by the following steps:

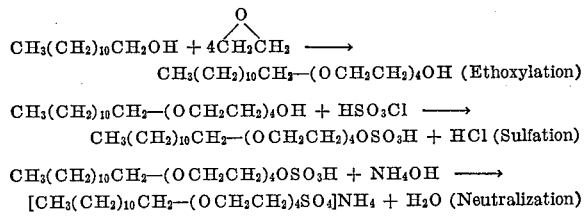

$$CH_3(CH_2)_{10}CH_2—(OCH_2CH_2)_4OH + HSO_3Cl \longrightarrow$$
$$CH_3(CH_2)_{10}CH_2—(OCH_2CH_2)_4OSO_3H + HCl \text{ (Sulfation)}$$

$$CH_3(CH_2)_{10}CH_2—(OCH_2CH_2)_4OSO_3H + NH_4OH \longrightarrow$$
$$[CH_3(CH_2)_{10}CH_2—(OCH_2CH_2)_4SO_4]NH_4 + H_2O \text{ (Neutralization)}$$

The foam-generating material to be suitably water retentive must further include an alcohol such as lauryl alcohol or its equivalent to reduce the excessive drainage rate whereby the foam will remain sufficiently "wet" for appreciable periods, making it effective in combating the fire or decontaminating the atmosphere depending upon the particular application.

The described material, depending upon the apparatus used, will generate foam ranging in expansion ratio from 50–2000/1 to low expansion ratio foam of the order of 10/1 and in either instance the foam material combines the requisite characteristics making it suitable for fire control.

In the following experiments, liquid spray rate on the net, air velocity, etc., were varied to produce air foams having a wide range of expansion ratios. In all tests, the expansion ratio of the air foam generated at the net was between 50/1 and 2000/1.

From the following examples it will be seen that although ethoxylated ammonium lauryl sulfate however will generate satisfactory foam with very hard water, the drainage rate is excessive and the excessive drainage rate is not correctable by increasing the amount of ethoxylated ammonium lauryl sulfate. When lauryl alcohol is added to the ethoxylated ammonium lauryl sulfate, a foam generated with high hardness water (this being the more difficult type foam material to work with), exhibits improved water retentiveness the same as is the case with foam produced using an ordinary hardness water. These results are illustrated in the following specific examples.

EXAMPLE I

Foaming agent: 29% ethoxylated ammonium lauryl sulfate
Additives: None
Solution preparation: 156 grams 29% ethoxylated ammonium lauryl sulfate diluted to 3 gal. with tap water
Active concentrations: 400 mg./100 ml. tap water (50–100 p.p.m. hardness)
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 159 | 18 | 130 | 12 |
| 7 | 173 | 11 | 138 | 7 |
| 10 | 178 | 8 | 140 | 5 |
| 15 | 180 | 7 | 143 | 3 |
| 30 | 188 | 3 | 145 | 2 |

EXAMPLE II

Foaming agent: 29% active ethoxylated ammonium lauryl sulfate
Additives: None
Solution preparation: 312 grams 29% ethoxylated ammonium lauryl sulfate diluted to 3 gal. with tap water
Active concentration: 800 mg./100 ml. of tap water
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 163 | 22 | 158 | 19 |
| 7 | 181 | 13 | 176 | 10 |
| 10 | 188 | 10 | 184 | 6 |
| 15 | 193 | 8 | 189 | 4 |
| 30 | 198 | 5 | 191 | 3 |

When lauryl alcohol is now added to the ethoxylated ammonium lauryl sulfate, as shown in the following Example III, the water retentiveness of the foam is substantially improved, and when the lauryl alcohol content is further increased as indicated in the following Examples IV, V and VI, the water retentiveness successively increases.

EXAMPLE III

Foaming agent: 29% ethoxylated ammonium lauryl sulfate
Additives: Lauryl alcohol—20 mg./100 ml.
Solution preparation: 183 grams 29% ethoxylated ammonium lauryl sulfate, diluted to 3.5 gal. with tap water (2.6 grams lauryl alcohol as free alcohol in the 183 grams)
Active concentration: 400 mg. ethoxylated amomonium lauryl sulfate/100 ml. of tap water
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 134 | 31 | 143 | 29 |
| 7 | 159 | 18 | 168 | 16 |
| 10 | 170 | 13 | 180 | 10 |
| 15 | 178 | 9 | 186 | 7 |
| 30 | 184 | 6 | 191 | 5 |

EXAMPLE IV

Foaming agent: 29% ethoxylated ammonium lauryl sulfate
Additives: Lauryl alcohol—30 mg./100 ml. of tap water
Solution preparation: 183 grams 29% ethoxylated ammonium lauryl sulfate plus 4.0 grams lauryl alcohol diluted to 3.5 gal. with tap water
Active concentration: 400 mg./100 ml.
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 33 | 83 | 33 | 84 |
| 7 | 72 | 63 | 73 | 63 |
| 10 | 95 | 51 | 95 | 52 |
| 15 | 113 | 42 | 114 | 43 |
| 30 | 155 | 20 | 156 | 22 |

EXAMPLE V

Foaming agent: 29% ethoxylated ammonium lauryl sulfate
Additives: Lauryl alcohol—40 mg./100 ml. of tap water
Solution preparation: 183 grams 29% ethoxylated ammonium lauryl sulfate plus 5.3 grams lauryl alcohol diluted to 3.5 gal. with tap water
Active concentration: 40 mg./100 ml.
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 27 | 87 | 28 | 88 |
| 7 | 68 | 68 | 69 | 70 |
| 10 | 98 | 54 | 101 | 56 |
| 15 | 128 | 40 | 134 | 42 |
| 30 | 167 | 22 | 175 | 24 |

EXAMPLE VI

Foaming agent: 29% ethoxylated ammonium lauryl sulfate
Additives: Lauryl alcohol–50 mg./100 ml.
Solution preparation: 183 grams 29% ethoxylated ammonium lauryl sulfate plus 6.7 grams lauryl alcohol diluted to 3.5 gal. with tap water
Active concentration: 400 mg./100 ml. of tap water
Solution temperature: 21° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 34 | 88 | 34 | 88 |
| 7 | 85 | 69 | 86 | 70 |
| 10 | 119 | 57 | 120 | 57 |
| 15 | 158 | 43 | 158 | 44 |
| 30 | 207 | 25 | 212 | 25 |

Comparing next Example VII with Example I, it will be seen that the ethoxylated ammonium lauryl sulfate is equally efficient in producing foam with a hard water in the order of 500 parts per million as it is with much softer water; but, the drainage rate is equally poor. When however as shown next in Examples VIII and IX lauryl alcohol is added to the ethoxylated ammonium lauryl sulfate the foam generated with 2500 parts per million hardness water, still produces an effective quantity of foam and the water retentiveness of the foam is excellent.

EXAMPLE VII

Foaming agent: 29% ethoxylated ammonium lauryl sulfate
Additives: None
Solution preparation: 156 grams 29% ethoxylated ammonium lauryl sulfate diluted to 3 gal. with 500 parts per million hard water
Active concentration: 400 mg./100 ml.
Solution temperature: 20° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 141 | 18 | 139 | 17 |
| 7 | 153 | 11 | 150 | 11 |
| 10 | 156 | 9 | 155 | 5 |
| 15 | 160 | 5 | 158 | 6 |
| 30 | 166 | 3 | 165 | 2 |

EXAMPLE VIII

Foaming agent: 29% ethoxylated ammonium lauryl sulfate
Additives: Lauryl alcohol–30 mg./100 ml.
Solution preparation: 183 grams 29% ethoxylated ammonium lauryl sulfate plus 4.0 grams lauryl alcohol diluted to 3.5 gal. with 2500 parts per million hard water
Active concentration: 400 mg./100 ml.
Solution temperature: 19° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 65 | 67 | 63 | 68 |
| 7 | 108 | 45 | 114 | 48 |
| 10 | 125 | 37 | 125 | 37 |
| 15 | 150 | 24 | 147 | 26 |
| 30 | 170 | 14 | 170 | 15 |

EXAMPLE IX

Foaming agent: 29% ethoxylated ammonium lauryl sulfate
Additives: Lauryl alcohol–70 mg./100 ml.
Solution preparation: 363 grams 29% ethoxylated ammonium lauryl sulfate plus 9.3 grams lauryl alcohol diluted to 3.5 gal. with synthetic sea water
Active concentration: 800 mg./100 ml.
Solution temperature: 19° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 25 | 86 | 20 | 88 |
| 7 | 67 | 64 | 53 | 69 |
| 10 | 83 | 55 | 73 | 57 |
| 15 | 108 | 42 | 97 | 43 |
| 30 | 135 | 27 | 126 | 25 |

Referring to Example IX, where synthetic sea water (see Naval Aircraft Factory Process Spec. PS–1, Navy Dept. Spec. 44T27B, dated July 1, 1940) is used for generating foam, this example shows it is possible with a proper combination of ethoxylated ammonium lauryl sulfate and lauryl alcohol to generate foam in substantial quantities; said foam is stable, is of an appropriate average size and is water retentive. Even after 30 minutes following generation of the foam, there remains a 27% water content foam without sign of either cloudiness or precipitation.

It would normally have been expected, that using sea water would produce only a thick curd, but that no foam would or could be generated; or, if any foam were to be produced, it would be quite unstable. Contrary, however to the expected result, there is produced a good quality foam which is stable, of a high water content, and water retention is good so that even after thirty minutes the moisture content can provide effective fire-fighting qualities.

Foam materials of the present invention are uniformly of low draining qualities and can be formulated to be relatively insensitive to any hardness water. The surfactants also have an acceptable viscosity with a 15% active material content and all generally have a sufficiently low cloud point for storage purposes at normal temperature.

The ammonium alkyl ether sulfate of the present invention can be produced by alkoxylation of long chain alcohols other than lauryl, followed by sulfonation and neutralization in the usual manner to provide equivalent materials. Thus, the formulator has opportunity for producing ethers of ammonium myristyl sulfate or other higher carbon content alcohols depending upon his specific selection of starting material. Also, the ammonium alkyl ether sulfate is usable with alcohols other than lauryl alcohol when high or low hardness water is employed. An example of a fatty alcohol other than lauryl alcohol is provided in the following Example X.

EXAMPLE X

Foaming agent: 29% ethoxylated ammonium lauryl sulfate
Additives: myristyl alcohol–40 mg./100 ml.
Solution preparation: 183 grams 29% ethoxylated ammonium lauryl sulfate plus 5.3 grams myristyl alcohol diluted to 3.5 gal. with tap water
Active concentration: 400 mg./100 ml. of tap water
Solution temperature: 21° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 272 | 46 | 314 | 46 |
| 7 | 337 | 33 | 372 | 36 |
| 10 | 387 | 23 | 425 | 27 |
| 15 | 408 | 19 | 465 | 20 |
| 30 | 443 | 12 | 505 | 13 |

The myristyl alcohol addition now can be compared with lauryl alcohol as follows:

EXAMPLE XI

Foaming agent: Same as Example X.
Additives: Lauryl alcohol–40 mg./100 ml.
Solution preparation: Some as Example X but 5.3 grams of lauryl alcohol in place of 5.3 grams of myristyl alcohol.
Active concentration: Same as Example X.
Solution temperature: 23° C.

| Wt. of Entrapped Foam at Time Zero, g | Sample 1 | | Sample 2 | |
|---|---|---|---|---|
| | 663 | | 679 | |
| | Ml. Drained | Weight Percent Left | Ml. Drained | Weight Percent Left |
| Drain Time, Min.: | | | | |
| 4 | 245 | 63 | 238 | 65 |
| 7 | 371 | 44 | 353 | 48 |
| 10 | 417 | 37 | 400 | 41 |
| 15 | 484 | 27 | 468 | 31 |
| 30 | 569 | 14 | 570 | 16 |

The two alcohol additions (Examples X and XI) can now be compared with no fatty alcohol in Example VII:

EXAMPLE XII

Foaming agent: 29% ethoxylated ammonium lauryl sulfate.
Additives: None.
Solution preparation: 183 grams 29% ethoxylated ammonium lauryl sulfate diluted to 3.5 gal. with tap water.
Active concentration: 400 mg./100 ml. of tap water.
Solution temperature: 23° C.

| Wt. of Entrapped Foam at Time Zero, g | Sample 1 | | Sample 2 | |
|---|---|---|---|---|
| | 194 | | 184 | |
| | Ml. Drained | Weight Percent Left | Ml. Drained | Weight Percent Left |
| Drain Time, Min.: | | | | |
| 4 | 159 | 18 | 128 | 13 |
| 7 | 173 | 11 | 137 | 7 |
| 10 | 179 | 8 | 140 | 5 |
| 15 | 181 | 7 | 143 | 3 |
| 30 | 189 | 3 | 146 | 2 |

From these examples, will be seen that myristyl alcohol, while not as efficient as lauryl alcohol, still provides a substantial improvement factor on the drainage rate of foam materials which do not include a fatty alcohol material.

It will be observed from the preceding examples that an increase in fatty alcohol/ammonium lauryl ether sulfate ratio in the air-foam liquid concentrate results in improved drainage characteristics of the air foam. Example VI, where the fatty alcohol content is 12.5%, by weight, of the ammonium lauryl ether sulfate content, shows the best drainage performance of the aforementioned examples.

Additional investigation has revealed that an increased amount of fatty alcohol of up to 30%, by weight, of the ammonium alkyl ether sulfate salt further improves the water-retentiveness of the air foam. This effect (as demonstrated by the data of Table I) is observable with both soft water and sea water.

It should be noted that the "lauryl ether sulfate" salts referred to in the following tables are not pure materials. The aliphatic alcohol feedstock for the initial ethoxylation step in preparing the alkyl ether sulfate salts used for most of my experiments was "Lorol," which is a technical grade of lauryl alcohol. "Lorol" is predominately lauryl alcohol but also contains a mixture of other alcohols having from 10- to 20 carbon atoms. These other alcohols also undergo alkoxylation, sulfation and neutralization. It should also be noted that the salts prepared from "Lorol" should be described as "alkyl ether sulfate" salts. However, because the "Lorol" used contains predominately lauryl alcohol, it is frequent commercial practice to name the salts (or aqueous concentrations thereof) as "lauryl ether sulfate" salts.

Additionally, the air-foam concentrates and air-foam solutions prepared with the alkyl ether sulfate salts will contain small amounts of unsulfated ethoxylated alcohol and inorganic salts resulting from various processing steps.

I used "Butyl Carbitol" as a solvent in most of the examples set forth in the following tables. "Butyl Carbitol" (or similar solvents as will be described later in the specification) was effective in permitting easy preparation of clear, fluid air-foam liquid concentrates, containing the alkyl ether sulfate salt-aliphatic alcohol combinations of the present invention.

The sea water used for the following experiments was prepared by dissolving 4.5 ounces of "Sea-Rite" salt in one gallon of tap water.

Ammonium lauryl ether sulfate-lauryl alcohol combinations

Table I illustrates the drainage behavior of high-expansion air foam produced using the ammonium salt of the sulfated condensation product of about 3.5 moles of ethylene oxide with one mole of "Lorol"—with and without lauryl alcohol. The aliphatic alcohol distribution in the "Lorol" was approximately $C_{10}=2\%$, $C_{12}=70\%$, $C_{14}=25\%$, $C_{16}-C_{18}=$Balance TABLE I.—DRAINAGE PERFORMANCE OF FOAM PRODUCED WITH AMMONIUM LAURYL ETHER SULFATE AND LAURYL ALCOHOL USING SOFT WATER AND SEA WATER

| | In Soft Water, Example | | | In Sea Water, Example | | |
|---|---|---|---|---|---|---|
| | A | B | C | D | E | F |
| A. Composition of Air-Foam Liquid Concentrate: | | | | | | |
| Wt. percent "Butyl Carbitol" | 33 | 32 | | | 17 | 40 |
| Wt. percent Ammonium Lauryl Ether Sulfate | 18 | 17 | 27 | 27 | 22 | 15 |
| Wt. percent Lauryl Alcohol | | 5.1 | 8.2 | | 2.7 | 4.5 |
| Water to make | (¹) | (¹) | (¹) | (¹) | (¹) | (¹) |
| B. Composition of Air-Foam Solution: | | | | | | |
| Concentration of "Butyl Carbitol," mg./ml | 735/100 | 760/100 | | | 310/100 | 1,065/100 |
| Concentration of Ammonium Lauryl Ether Sulfate, mg./ml | 400/100 | 400/100 | 200/100 | 400/100 | 400/100 | 400/100 |
| Concentration of Lauryl Alcohol, mg./ml | | 120/100 | 60/100 | | 50/100 | 120/100 |
| Water to make | (¹) | (¹) | (¹) | (¹) | (¹) | (¹) |
| C. Wt. of Foam at "t"=0 (grams) | 157 | 194 | 283 | 174 | 207 | 212 |
| D. Wt. percent of Water Remaining in Foam at Time "t", "t" (min.): | | | | | | |
| 4 | 20 | 98 | 89 | 16 | 95 | 99 |
| 7 | 13 | 92 | 80 | 10 | 82 | 95 |
| 10 | 8 | 83 | 65 | 7 | 72 | 90 |
| 15 | 5 | 63 | 48 | 5 | 56 | 73 |
| 30 | 3 | 39 | 23 | 3 | 33 | 41 |

¹ Balance.

Comparison of the drainage rate of air foam produced, using the air-foam liquid concentrate composition of Table I–Examples B and C (where lauryl alcohol is present in an amount of 30%, by weight, of the ammonium lauryl ether sulfate) with the drainage rate of the air foam of aforementioned Example VI, reveals the improvement in water-retentiveness which can be achieved at the higher fatty alcohol/lauryl ether sulfate salt ratio.

The aliphatic alcohol content may be further increased to perhaps as high as 70% of the lauryl ether sulfate salt content; however, little would be gained by increases above 30%.

Comparison of Example VI (no "Butyl Carbitol" in air-foam liquid concentrate with Table I–Example A ("Butyl Carbitol" present) shows that "Butyl Carbitol" does not significantly improve the poor drainage characteristics of air foam produced, using the alkyl ether sulfate salt alone.

Ammonium lauryl ether sulfate-miristyl alcohol combination

Table II illustrates the drainage performance of air foam produced, using the ammonium lauryl ether sulfate of Table I plus a myristyl alcohol additive.

Examples A and D of Table II show a marked increase in water-retentiveness of the air foam over that observed in preceding Example X.

It should be understood that the data of Tables I and II are only example combinations of ammonium lauryl ether sulfate—$C_{12}$– to $C_{14}$ aliphatic alcohol which show improved water retentiveness of air foam, as compared with foam produced, using ammonium lauryl ether sulfate alone. As will be shown later in the specification, a wide range of concentration of both the ammonium lauryl sulfate and $C_{12}$ to $C_{14}$ aliphatic alcohol are useful for my invention. For example, the air-foam liquid concentrate may be diluted with a high concentration of solvent, so as to lower the turbidity temperature of said concentrate. This necessarily decreases the concentration of the fatty alcohol and the lauryl ether sulfate salt.

Ammonium lauryl ether sulfate-cetyl alcohol combination

I have found that cetyl alcohol in combination with the ammonium lauryl ether sulfate of Table I and Table II increases the water-retentiveness of air foam in the same manner as was shown previously to be the case with lauryl and myristyl alcohol. Table III presents examples of the effect of the presence of cetyl alcohol on drainage performance of air foam made using this combination.

TABLE II.—DRAINAGE PERFORMANCE OF FOAM PRODUCED WITH AMMONIUM LAURYL ETHER SULFATE AND MYRISTYL ALCOHOL USING SOFT WATER AND SEA WATER

| | In Soft Water, Example A | In Sea Water, Example | | |
|---|---|---|---|---|
| | | B | C | D |
| A. Composition of Air-Foam Liquid Concentrate: | | | | |
| Wt. percent "Butyl Carbitol" | 32 | | 14 | 32 |
| Wt. percent Ammonium Lauryl Ether | 17 | 27 | 23 | 17 |
| Wt. percent Myristyl Alcohol | 5.1 | | 2.3 | 5.1 |
| Water to make | Balance | | Balance | |
| B. Composition of Air-Foam Solution: | | | | |
| Concentration of "Butyl Carbitol," mg./ml | 755/100 | | 245/100 | 755/100 |
| Concentration of Ammonium Lauryl Ether Sulfate, mg./ml | 400/100 | 400/100 | 400/100 | 400/100 |
| Concentration of Myristyl Alcohol, mg./ml | 120/100 | | 40/100 | 120/100 |
| Water to make | Balance | | Balance | |
| C. Wt. of Foam at "t"=0 (grams) | 186 | 174 | 376 | 317 |
| D. Wt. percent of Water Remaining in Foam at Time "t", "t" (min.): | | | | |
| 4 | 96 | 16 | 93 | 97 |
| 7 | 84 | 10 | 82 | 92 |
| 10 | 72 | 7 | 69 | 83 |
| 15 | 57 | 5 | 53 | 72 |
| 30 | 24 | 3 | 30 | 46 |

TABLE III.—DRAINAGE PERFORMANCE OF FOAM PRODUCED WITH AMMONIUM LAURYL ETHER SULFATE AND CETYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. percent "Butyl Carbitol" |  | 50 | 32 |  | 50 | 32 |
| Wt. percent Ammonium Lauryl | 29 | 13 | 17 | 27 | 13 | 17 |
| Wt percent Cetyl Alcohol |  | 0.67 | 5.1 |  | 0.67 | 5.1 |
| Water to make |  | Balance |  |  | Balance |  |
| B. Composition of Air-Foam Solution: | | | | | | |
| Concentration of "Butyl Carbitol", mg./ml |  | 1,530/100 | 755/100 |  | 1,530/100 | 755/100 |
| Concentration of Ammonium Lauryl Ether Sulfate, mg./ml | 400/100 | 400/100 | 400/100 | 400/100 | 400/100 | 400/100 |
| Concentration of Cetyl Alcohol, mg./ml |  | 20/100 | 120/100 |  | 20/100 | 120/100 |
| Water to make |  | Balance |  |  | Balance |  |
| C. Wt. of Foam at "t"=0 (grams) | 194 | 172 | 173 | 174 | 137 | 211 |
| D. Wt. percent of Water Remaining in Foam at Time "t", "t" (min.): | | | | | | |
| 4 | 18 | 36 | 60 | 16 | 42 | 45 |
| 7 | 11 | 25 | 50 | 10 | 29 | 32 |
| 10 | 8 | 20 | 38 | 7 | 21 | 26 |
| 15 | 7 | 12 | 30 | 5 | 14 | 20 |
| 30 | 3 | 8 | 18 | 3 | 8 | 12 |

Sodium lauryl ether sulfate-aliphatic alcohol combinations

As stated hereinbefore, other salts of alkyl ether sulfates are useful for my invention. I have found that sodium lauryl ether sulfate in combination with lauryl, myristyl and cetyl alcohol provide materials which are useful for producing water-retentive, high-expansion, fire-extinguishing foam with water ranging in hardness from soft water upwardly to seawater hardness.

The sodium lauryl ether sulfate referred to in the following Tables IV, V and VI is the sodium salt of the sulfated condensation product of about 4 moles of ethylene oxide with one mole of "Lorol." The aliphatic alcohol distribution in the "Lorol" was approximately $C_{10} = 4\%$, $C_{12} = 60\%$, $C_{14} = 25\%$, $C_{16}-C_{18} =$ Balance.

The drainage performances of air foams produced with this material in combination with lauryl, myristyl and cetyl alcohol are shown in Table IV, V and VI respectively.

TABLE IV.—DRAINAGE PERFORMANCE OF FOAM PRODUCED WITH SODIUM LAURYL ETHER SULFATE AND LAURYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. Percent of "Butyl Carbitol" |  | 8 | 32 |  | 8 | 60 |
| Wt. Percent Sodium Lauryl Ether Sulfate | 27 | 25 | 17 | 27 | 25 | 5 |
| Wt. Percent Lauryl Alcohol |  | 1.2 | 5.1 |  | 1.2 | 1.5 |
| Water to make |  | Balance |  |  | Balance |  |
| B. Composition of Air-Foam Solution: | | | | | | |
| Concentration of "Butyl Carbitol" mg./ml |  | 125/100 | 755/100 |  | 125/100 | 1,200/100 |
| Concentration of Sodium Lauryl Ether Sulfate, mg./ml | 400/100 | 400/100 | 400/100 | 400/100 | 400/100 | 100/100 |
| Concentration of Lauryl Alcohol, mg./ml |  | 20/100 | 120/100 |  | 20/100 | 30/100 |
| Water to make |  | Balance |  |  | Balance |  |
| C. Wt. of Foam at "t"=0 (grams) | 159 | 279 | 178 | 179 | 230 | 371 |
| D. Wt. Percent of Water Remaining in Foam at Time "t", "t" (min.): | | | | | | |
| 4 | 17 | 61 | 98 | 22 | 37 | 87 |
| 7 | 9 | 15 | 93 | 12 | 25 | 49 |
| 10 | 4 | 9 | 82 | 9 | 20 | 39 |
| 15 | 2 | 7 | 62 | 4 | 15 | 26 |
| 30 | 0 | 4 | 43 | 1 | 10 | 11 |

TABLE V.—DRAINAGE PERFORMANCE OF FOAM PRODUCED WITH SODIUM LAURYL ETHER SULFATE AND MYRISTYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. Percent "Butyl Carbitol" |  | 8 | 32 |  | 8 | 32 |
| Wt. Percent Sodium Lauryl Ether Sulfate | 27 | 25 | 17 | 27 | 25 | 17 |
| Wt. Percent Myristyl Alcohol |  | 1.2 | 5.1 |  | 1.2 | 1.5 |
| Water to make |  | Balance |  |  | Balance |  |
| B. Composition of Air-Foam Solution: | | | | | | |
| Concentration of "Butyl Carbitol", mg./ml |  | 125/100 | 755/100 |  | 125/100 | 755/100 |
| Concentration of Sodium Lauryl Ether Sulfate, mg./ml | 400/100 | 400/100 | 400/100 | 400/100 | 400/100 | 400/100 |
| Concentration of Myristyl Alcohol, mg./ml |  | 20/100 | 120/100 |  | 20/100 | 120/100 |
| Water to make |  | Balance |  |  | Balance |  |
| C. Wt. of Foam at "t"=0 (grams) | 159 | 185 | 158 | 179 | 224 | 198 |
| D. Wt. of Water Remaining in Foam at Time "t", "t" (min.): | | | | | | |
| 4 | 17 | 79 | 90 | 22 | 80 | 90 |
| 7 | 9 | 61 | 80 | 12 | 61 | 75 |
| 10 | 4 | 49 | 67 | 9 | 52 | 63 |
| 15 | 2 | 37 | 52 | 4 | 40 | 46 |
| 30 | 0 | 23 | 37 | 1 | 23 | 25 |

TABLE VI.—DRAINAGE PERFORMANCE OF FOAM PRODUCED WITH SODIUM LAURYL ETHER SULFATE AND CETYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. Percent "Butyl Carbitol" |  | 8 | 32 |  | 8 | 32 |
| Wt. Percent Sodium Lauryl Ether Sulfate | 27 | 25 | 17 | 27 | 25 | 17 |
| Wt. Percent Cetyl Alcohol |  | 1.2 | 5.1 |  | 1.2 | 5.1 |
| Water to make |  | Balance |  |  | Balance |  |
| B. Composition of Air-Foam Solution: | | | | | | |
| Concentration of "Butyl Carbitol", mg./ml |  | 125/100 | 755/100 |  | 125/100 | 755/100 |
| Concentration of Sodium Lauryl Ether Sulfate, mg./ml | 400/100 | 400/100 | 400/100 | 400/100 | 400/100 | 400/100 |
| Concentration of Cetyl Alcohol, mg./ml |  | 20/100 | 120/100 |  | 20/100 | 120/100 |
| Water to make |  | Balance |  |  | Balance |  |
| C. Wt. of Foam at "t"=0 (grams) | 159 | 172 | 180 | 179 | 280 | 257 |
| D. Wt. Percent of Water Remaining in Foam at Time "t", "t" (min.): | | | | | | |
| 4 | 17 | 57 | 58 | 22 | 46 | 29 |
| 7 | 9 | 48 | 45 | 12 | 38 | 21 |
| 10 | 4 | 33 | 33 | 9 | 31 | 89 |
| 15 | 2 | 26 | 26 | 4 | 26 | 31 |
| 30 | 0 | 14 | 16 | 1 | 15 | 21 |

Triethanolamine lauryl ether sulfate-aliphatic alcohol combinations

My investigations have further revealed that triethanolamine lauryl ether sulfate in combination with lauryl alcohol, myristyl alcohol and cetyl alcohol provide materials which are useful for producing water-retentive fire-extinguishing high-expansion foams with water ranging in hardness from soft water upward to sea water hardness.

The behavior of foams produced with various combinations of these materials is shown in Tables VII, VIII and IX.

The triethanolamine lauryl ether sulfate referred to in Tables VII, VIII and IX is the triethanolamine salt of the sulfated condensation product of about 4 moles of ethylene oxide with one mole of "Lorol." The "Lorol" had an alcohol distribution of approximately $C_{10} = 2\%$, $C_{12} = 69\%$, $C_{14} = 24\%$, $C_{16} = 4\%$ and $C_{18} = 1\%$.

TABLE VII.—DRAINAGE PERFORMANCE OF FOAM PRODUCED WITH TRIETHANOLAMINE LAURYL ETHER SULFATE AND LAURYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. percent "Butyl Carbitol" |  | 8 | 60 |  | 8 | 34 |
| Wt. percent Triethanolamine Lauryl Ether Sulfate | 30 | 27 | 4.0 | 30 | 27 | 18 |
| Wt. percent Lauryl Alcohol |  | 1.3 | 1.4 |  | 1.3 | 5.5 |
| Water to make |  | Balance |  |  | Balance |  |
| B. Composition of Air-Foam Solution: | | | | | | |
| Concentration of "Butyl Carbitol", mg./ml |  | 120/100 | 1,200/100 |  | 120/100 | 755/100 |
| Concentration of Triethanolamine Lauryl Ether Sulfate, mg./ml | 400/100 | 400/100 | 100/100 | 400/100 | 400/100 | 400/100 |
| Concentration of Lauryl Alcohol, mg./ml |  | 20/100 | 30/100 |  | 20/100 | 120/100 |
| Water to make |  | Balance |  |  | Balance |  |
| C. Wt. of Foam at "t"=0 (grams) | 195 | 138 | 407 | 565 | 383 | 279 |
| D. Wt. percent of Water Remaining in Foam at Time "t", "t" (min): | | | | | | |
| 4 | 14 | 63 | 83 | 12 | 42 | 90 |
| 7 | 8 | 45 | 53 | 6 | 33 | 74 |
| 10 | 4 | 32 | 42 | 3 | 25 | 60 |
| 15 | 2 | 23 | 28 | 2 | 18 | 48 |
| 30 | 0 | 9 | 10 | 1 | 12 | 28 |

TABLE VIII.—DRAINAGE PERFORMANCE OF FOAM PRODUCED WITH TRIETHANOLAMINE LAURYL ETHER SULFATE AND MYRISTYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. percent "Butyl Carbitol" |  | 8 | 34 |  | 8 | 34 |
| Wt. percent Triethanolamine Lauryl Ether Sulfate | 30 | 27 | 18 | 30 | 27 | 18 |
| Wt. Percent Myristyl Alcohol |  | 1.3 | 5.5 |  | 1.3 | .5 |
| Water to make |  | Balance |  |  | Balance |  |
| B. Composition of Air-Foam Solution: | | | | | | |
| Concentration of "Butyl Carbitol", mg./ml |  | 120/100 | 755/100 | 120/100 |  | 755/100 |
| Concentration of Thiethanolamine Lauryl Ether Sulfate, mg./ml | 400/100 | 400/100 | 000/100 | 400/100 | 400/100 | 400/100 |
| Concentration of Myristyl Alcohol, mg./ml |  | 20/100 | 120/100 |  | 20/100 | 120/100 |
| Water to make |  | Balance |  |  | Balance |  |
| C. Wt. of Foam at "t"=0 (grams) | 195 | 317 | 193 | 655 | 366 | 296 |
| D. D. Wt. Percent of Water Remaining in Foam at Time "t", "t" (min): | | | | | | |
| 4 | 14 | 80 | 96 | 12 | 71 | 89 |
| 7 | 8 | 51 | 86 | 6 | 52 | 74 |
| 10 | 4 | 39 | 74 | 3 | 40 | 55 |
| 15 | 2 | 27 | 58 | 2 | 29 | 41 |
| 30 | 0 | 10 | 35 | 1 | 15 | 21 |

TABLE IX.—DRAINAGE PERFORMANCE OF FOAM PRODUCED WITH TRIETHANOLAMINE LAURYL ETHER SULFATE AND CETYL ALCOHOL USING SOFT WATER AND SEA WATER

|  | In Soft Water, Example | | | In Sea Water, Example | | |
|---|---|---|---|---|---|---|
|  | A | B | C | D | E | F |
| A. Composition of Air-Foam Liquid Concentrate: | | | | | | |
| Wt. Percent "Butyl Carbitol" | | 8 | 34 | | 8 | 34 |
| Wt. Percent Triethanolamine Lauryl Ether Sulfate | 30 | 27 | 18 | 30 | 27 | 18 |
| Wt. Percent Cetyl Alcohol | | 1.3 | 5.5 | | 1.3 | 5.5 |
| Water to make | Balance | | | Balance | | |
| B. Composition of Air-Foam Solution: | | | | | | |
| Concentration of "Butyl Carbitol", mg./ml | | 120/100 | 755/100 | | 120/100 | 755/100 |
| Concentration of Triethanolamine Lauryl Ether Sulfate, mg./ml | 400/100 | 400/100 | 400/100 | 400/100 | 400/100 | 400/100 |
| Concentration of Cetyl Alcohol, mg./ml | | 20=/100 | 120/100 | | 20/100 | 120/100 |
| Water to make | Balance | | | Balance | | |
| C. Wt. of Foam at "t"=0 (grams) | 195 | 138 | 179 | 565 | 232 | 176 |
| D. Wt. Percent of Water Remaining in Foam at Time "t", "t" (min): | | | | | | |
| 4 | 14 | 62 | 10 | 12 | 42 | 33 |
| 7 | 8 | 45 | 17 | 6 | 33 | 25 |
| 10 | 4 | 32 | 37 | 3 | 25 | 19 |
| 15 | 2 | 23 | 29 | 2 | 18 | 13 |
| 30 | 0 | 9 | 15 | 1 | 12 | 7 |

Magnesium lauryl ether sulfate-aliphatic alcohol combinations

The magnesium and calcium salts of the alkyl ether sulfates are water-soluble and suitable for my application. No precipitate was observed in experiments in which the alkyl ether sulfate salts were added to sea water—although the sae water contained amounts of magnesium and calcium many times greater than that stoichiometrically equivalent to the alkyl ether sulfate anion concentration.

Table X shows the drainage properties of foam produced using the magnesium alkyl ether sulfate of 3.5 moles of ethylene oxide with one mole of "Lorol." The "Lorol" had an aliphatic alcohol distribution similar to that used in preparing the alkyl ether sulfate of Table I.

salts of condensates containing higher percentages of ethylene oxide would also be useful; however, there is a decrease in foaming power.

The water soluble salts of the sulfated condensation products of about 1 to about 3 moles of ethylene oxide with one mole of $C_{10}$- to $C_{20}$ alcohol in combination with $C_{12}$- to $C_{16}$ normal primary alcohol, are also useful for my invention. The statement "about 3 moles" includes 2.5 moles up to 3.5 moles.

Table XI illustrates the drainage behavior of high-expansion air foam produced using the ammonium salt of the sulfated condensation product of 1 mole of ethylene oxide with one mole of "Lorol"—with and without lauryl alcohol. The aliphatic alcohol distribution in the "Lorol"

TABLE X.—DRAINAGE PERFORMANCE OF FOAM PRODUCED WITH MAGNESIUM LAURYL ETHER SULFATE AND LAURYL ALCOHOL USING SOFT WATER AND SEA WATER

|  | In Soft Water, Example | | In Sea Water, Example | |
|---|---|---|---|---|
|  | A | B | C | D |
| A. Composition of Air-Foam Liquid Concentrate: | | | | |
| Wt. Percent "Butyl Carbitol" | 7 | 7 | 7 | 7 |
| Wt. Percent Magnesium Lauryl Ether Sulfate | 28 | 27 | 28 | 27 |
| Wt. Percent Lauryl Alcohol | | 3.6 | | 3.6 |
| Water to make | Balance | | Balance | |
| B. Composition of Air-Foam Solution: | | | | |
| Concentration of "Butyl Carbitol," mg./ml | 100/100 | 105/100 | 59/100 | 52/100 |
| Cojcentration of Magnesium Lauryl Ether Sulfate, mg./ml | 400/100 | 409/100 | 200/100 | 200/100 |
| Concentration of Lauryl Alcohol, mg./ml | | 54/100 | | 27/100 |
| Water to make | Balance | | Balance | |
| C. Wt. of Foam at "t"=0 (grams) | 209 | 222 | 239 | 263 |
| D. Wt. Percent of Water Remaining in Foam at Time "t", "t" (min.): | | | | |
| 4 | 14 | 94 | 10 | 87 |
| 7 | 8 | 80 | 6 | 72 |
| 10 | 5 | 68 | 4 | 56 |
| 15 | 3 | 51 | 2 | 41 |
| 30 | 1 | 32 | 1 | 24 |

The preceding tables have illustrated the usefulness of alkyl ether sulfate salts of about 4 moles of ethylene oxide with 1 mole of $C_{12}$- to $C_{20}$ alcohol, in combination with $C_{12}$- to $C_{16}$ normal primary alcohol. By "about 4 moles," I mean, for example, 3.5 and 4.5 moles. The was approximately $C_{10}=2\%$, $C_{12}=70\%$, $C_{14}=25\%$, $C_{16}$-$C_{18}$=Balance.

TABLE XI.—DRAINAGE PERFORMANCE OF FOAM PRODUCED WITH AMMONIUM LAURYL ETHER SULFATE (EtO=1) AND LAURYL ALCOHOL USING SOFT WATER AND SEA WATER

|  | In Soft Water, Example | | | | In Sea Water, Example | | | |
|---|---|---|---|---|---|---|---|---|
|  | A | B | C | D | E | F | G | H |
| A. Composition of Air-Foam Liquid Concentrate: | | | | | | | | |
| Wt. percent "Butyl Carbitol" | | 8 | 8 | 60 | | 8 | 16 | 8 |
| Wt. percent Ammonium Lauryl Ether Sulfate | 26 | 24 | 23 | 7 | 26 | 24 | 10 | 22 |
| Wt. percent Lauryl Alcohol | | | 2.3 | 2.1 | | | 1.0 | 6.7 |
| Water to make | Balance | | | | Balance | | | |
| B. Composition of Air-Foam Solution: | | | | | | | | |
| Concentration of "Butyl Carbitol," mg./ml | | 135/100 | 140/100 | 1,290/100 | | 135/100 | 640/100 | 145/100 |
| Concentration of Ammonium Lauryl Ether Sulfate, mg./ml | 400/100 | 400/100 | 400/100 | 150/100 | 400/100 | 400/100 | 400/100 | 400/100 |
| Concentration of Lauryl Alcohol, mg./ml | | | 40/100 | 45/100 | | | 40/100 | 120/100 |
| Water to make | Balance | | | | Balance | | | |
| C. Wt. of Foam at "t"=0 (grams) | 304 | 297 | 95 | 295 | 307 | 315 | 245 | 191 |
| D. Wt. percent of Water Remaining in Foam at Time "t", "t" (min.): | | | | | | | | |
| 4 | 21 | 19 | 94 | 85 | 17 | 16 | 59 | 99 |
| 7 | 8 | 7 | 79 | 70 | 11 | 10 | 45 | 92 |
| 10 | 5 | 4 | 66 | 56 | 7 | 6 | 38 | 81 |
| 15 | 3 | 2 | 57 | 41 | 6 | 3 | 32 | 69 |
| 30 | 1 | 1 | 33 | 22 | 4 | 2 | 24 | 35 | oxide with 1 mole of $C_{12}$- to $C_{20}$ alcohol, in combination with $C_{12}$- to $C_{16}$ normal primary alcohol. By "about 4 moles," I mean, for example, 3.5 and 4.5 moles. The Table XII shows the drainage behavior of high expansion air foam produced using the sodium salt of the sulfated condensation product of 1 mole of ethylene oxide with one mole of "Lorol"—with and without lauryl alcohol. The "Lorol" use in preparing this sodium salt was identical with that used in preparing the ammonium lauryl ether sulfate of Table XI.

Again, the data of Table XII clearly demonstrates the improvement in drainage properties of the air foam due to the presence of lauryl alcohol.

alcohol. These data are shown in Table XIV (condensate with 2 moles of ethylene oxide) and Table XV (condensate with 3 moles of ethylene oxide).

The sodium salts of the lauryl ether sulfates of Tables XIV and XV were prepared, using a synthetic normal primary "Alfol" alcohol such as that described by Matson [Soap and Chemical Specialties, 39, No. 11 (1963)].

TABLE XII.—DRAINAGE PERFORMANCE OF FOAM PRODUCED WITH SODIUM LAURYL ETHER SULFATE (EtO=1) AND ALURYL ALCOHOL USING SOFT WATER AND SEA WATER

| | In Soft Water, Example | | | In Sea Water, Example | | |
|---|---|---|---|---|---|---|
| | A | B | C | D | E | F |
| A. Composition of Air-Foam Liquid Concentrate: | | | | | | |
| Wt. percent "Butyl Carbitol" | | 8 | 60 | | 8 | 11 |
| Wt. percent Sodium Lauryl Ether Sulfate | 25 | 23 | 7 | 25 | 23 | 21 |
| Wt. percent Lauryl Alcohol | | 2.3 | 2.1 | | 2.3 | 4.2 |
| Water to make | | Balance | | | Balance | |
| B. Composition of Air-Foam Solution: | | | | | | |
| Concentration of "Butyl Carbitol," mg./ml | | 140/100 | 1,290/100 | | 140/100 | 210/100 |
| Concentration of Sodium Lauryl Ether Sulfate, mg./ml | 400/100 | 400/100 | 150/100 | 400/100 | 400/100 | 400/100 |
| Concentration of Lauryl Alcohol, mg./ml | | 40/100 | 45/100 | | 40/100 | 80/100 |
| Water to make | | Balance | | | Balance | |
| C. Wt. of Foam at "t"=0 (grams) | 225 | 331 | 248 | 149 | 144 | 301 |
| D. Wt. Percent of Water Remaining in Foam a Time "t", "t" (min.): | | | | | | |
| 4 | 20 | 85 | 99 | 26 | 38 | 96 |
| 7 | 12 | 68 | 86 | 18 | 26 | 83 |
| 10 | 9 | 54 | 77 | 11 | 22 | 69 |
| 15 | 5 | 42 | 57 | 6 | 17 | 51 |
| 30 | 2 | 26 | 35 | 1 | 11 | 36 |

Table XIII shows that the lauryl alcohol has an approximate equivalent in myristyl alcohol in inhibiting the drainage rate of water from air foam.

The "Alfol" had an alcohol distribution as follows: $C_{10}$=Trace, $C_{12}$=60%, $C_{14}$=25%, $C_{16}$=11% and $C_{16}$- to $C_{20}$=Balance. The ammonium salts were prepared TABLE XIII.— DRAINAGE PERFORMANCE OF FOAM PRODUCED WITH LAURYL ETHER SULFATE SALTS (EtO=1) AND MYRISTYL ALCOHOL

| | In Soft Water | In Sea Water |
|---|---|---|
| A. Compositon of Air-Foam Liquid Concentrate: | | |
| Wt. Percent "Butyl Carbitol" | 17 | 16 |
| Wt. Percent Sodium Lauryl Ether Sulfate of Table XII | 20 | |
| Wt. Percent Ammonium Lauryl Ether Sulfate of Table XI | | 20 |
| Wt. Percent Myristyl Alcohol | 5.9 | 6.2 |
| Water to make | Balance | Balance |
| B. Composition of Air-Foam Solution: | | |
| Concentration of "Butyl Carbitol," mg./ml | 340/100 | 320/100 |
| Concentration of Sodium Lauryl Ether Sulfate of Table XII, mg./ml | 400/100 | |
| Concentration of Ammonium Lauryl Ether Sulfate of Table XI, mg./ml | | 400/100 |
| Concentration of Myristyl Alcohol, mg./ml | 120/100 | 125/100 |
| Water to make | Balance | Balance |
| C. Wt of Foam at "t"=0 (grams) | 289 | 195 |
| D. Wt. Percent of Water Remaining in Foam at Time "t", "t" (min.): | | |
| 4 | 88 | 92 |
| 7 | 74 | 85 |
| 10 | 60 | 67 |
| 15 | 46 | 54 |
| 30 | 27 | 30 |

I have also tested water soluble salts of the sulfated condensation products of 2 and 3 moles of ethylene oxide with one mole of "Lorol" and one mole of "Alfol" from "Lorol," identical in composition with that used in preparing the ammonium lauryl ether sulfate of Table XI.

TABLE XIV.—DRAINAGE PERFORMANCE OF FOAM PRODUCED WITH LAURYL ETHER SULFATE SALTS (EtO=2) AND LAURYL ALCOHOL

| | In Soft Water, Example | | In Sea Water, Example | |
|---|---|---|---|---|
| | A | B | C | D |
| A. Composition of Air-Foam Liquid Concentrate: | | | | |
| Wt. Percent Butyl Carbitol | 12 | 11 | 12 | 11 |
| Wt. Percent Sodium Lauryl Ether Sulfate | 25 | 24 | | |
| Wt. Percent Ammonium Lauryl Ether Sulfate | | | 24 | 23 |
| Wt. Percent Lauryl Alcohol | | 4.2 | | 4.2 |
| Water ot make | Balance | | Balance | |
| B. Composition of Air-Foam Solution: | | | | |
| Concentration of "Butyl Carbitol," mg./ml | 210/100 | 200/100 | 215/100 | 195/100 |
| Concentration of Sodium Lauryl Ether Sulfate, mg./ml | 440/100 | 440/100 | | |
| Concentration of Ammonium Lauryl Ether Sulfate, m/g.ml | | | 430/100 | 410/100 |
| Concentration of Lauryl Alcohol, mg./ml | | 80/100 | | 75/100 |
| Water to make | Balance | | Balance | |
| C. Wt. of Foam at "t"=0 (grams) | 301 | 223 | 268 | 268 |
| D. Wt. Percent of Water Remaining in Foam at Time "t", "t" (min.): | | | | |
| 4 | 17 | 99 | 22 | 97 |
| 7 | 10 | 87 | 12 | 86 |
| 10 | 7 | 77 | 7 | 72 |
| 15 | 5 | 56 | 5 | 55 |
| 30 | 2 | 39 | 3 | 32 |

TABLE XV.—DRAINAGE PERFORMANCE OF FOAM PRODUCED WITH LAURYL ETHER SULFATE SALTS (EtO=3) AND LAURYL ALCOHOL

| | In Soft Water, Example | | In Sea Water, Example | |
|---|---|---|---|---|
| | A | B | C | D |
| A. Composition of Air-Foam Liquid Concentrate: | | | | |
| Wt. Percent "Butyl Carbitol" | | 9 | 9 | 9 |
| Wt. Percent Sodium Lauryl Ether Sulfate | | | 24 | 23 |
| Wt. Percent Ammonium Lauryl Ether Sulfate | 28 | 24 | | |
| Wt. Percent Lauryl Alcohol | | 4.8 | | 4.5 |
| Water to make | Balance | Balance | Balance | Balance |
| B. Composition of Air-Foam Solution: | | | | |
| Concentration of "Butyl Carbitol," mg./ml | | 75/100 | 150/100 | 155/100 |
| Concentration of Sodium Lauryl Ether Sulfate, mg./ml | | | 400/100 | 400/100 |
| Concentration of Ammonium Lauryl Ether Sulfate, mg./ml | 200/100 | 200/100 | | |
| Concentration of Lauryl Alcohol, mg./ml | | 40/100 | | 80/100 |
| Water to make | Balance | Balance | Balance | Balance |
| C. Wt. of Foam at "t"=0 (grams) | 360 | 442 | 225 | 268 |
| D. Wt. Percent of Water Remaining in Foam at Time "t", "t" (min.): | | | | |
| 4 | 15 | 76 | 20 | 94 |
| 7 | 8 | 56 | 11 | 82 |
| 10 | 7 | 47 | 7 | 71 |
| 15 | 4 | 35 | 4 | 52 |
| 30 | 3 | 23 | 2 | 28 |

Commercial concentrates of the alkyl ether sulfate salts of the present invention usually contained about 30%, by weight, of said salts. However, more highly concentrated solutions (or the dry salts) of the alkyl ether sulfates can be used as one of the ingredients for formulation of the air-foam liquid concentrates. Thus, highly concentrated air-foam liquid concentrates can be formulated, with the attendant advantage of smaller storage requirements to produce a given volume of air foam. For example, I have obtained aqueous concentrates of alkyl ether sulfate salts having a concentration of said salt of about 70%, by weight.

The data of the preceding tables demonstrates that, in all cases, lauryl, myristyl and cetyl alcohol in air-foam liquid concentrates and air-foam solutions containing the described water-soluble alkyl ether sulfate salts improves the water-retentiveness of fire-extinguishing, high-expansion foam produced, using these materials—as compared with foam produced in an identical manner without these additives. This is true whether the foams are produced with soft water or waters ranging in hardness upwardly to sea water hardness.

Thus, it is now possible to generate high expansion foam at an acceptable rate, appropriate size and requisite water-retentiveness for the particular application. The invention is readily adaptable to maritime use, thus safeguarding more lives and property where, for example, only sea water is available in adequate quantities for fire-fighting purposes.

Evidence indicates that, in water solution, the anions of the alkyl ether sulfate salts, together with $C_{12}$–$C_{16}$ aliphatic alcohol are responsible for the aforesaid improved drainage performance of the high-expansion fire-extinguishing foam produced from air-foam solutions containing these materials. The alkyl ether sulfuric ester can be neutralized with a number of basic materials, e.g., $NH_4OH$, $Mg(OH)_2$, etc. to provide alkyl ether sulfate salts having the cation common with that contained in the basic material. Several examples follow:

$R(OR')_nOSO_3H + NH_4OH \rightarrow [R(OR')_nSO_4]NH_4 + H_2O$ $2R(OR')_nOSO_3H + Mg(OH)_2 \rightarrow [R(OR')_nSO_4]Mg + 2H_2O$ $R(OR')_nOSO_3H + NH(CH_2CH_2OH)_2 \rightarrow [R(OR')_nSO_4]NH_2(CH_2CH_2OH)_2$ etc., where:

$n = 1$–$4$ $R = C_{10}$–$C_{20}$ alkyl groups, e.g., decyl, lauryl, myristyl, etc.

$R' =$ an ethylene group.

Upon dissolving the salt in water, dissociation occurs as follows:

$Mg[R(OR')_nSO_4]$ (salt) $\rightarrow$ $Mg^{+2}$ (cation+)2 $[R(OR')_nSO_4]^-$ (anion)

The anion, in combination with the $C_{12}$– to $C_{16}$ aliphatic alcohol is responsible for the improved drainage performance of the air foam.

It is necessary that the cation be chosen so that a sufficiently high concentration of the alkyl ether sulfate salt can be achieved. The formulator has an opportunity to choose a variety of such salts. It should be understood that these salts, when used in combination with $C_{12}$– to $C_{16}$ normal primary aliphatic alcohol are within the scope of my invention.

Preparation of air-foam liquid concentrates

In order to retain the components in solution at lower temperatures, pending use, I include effective amounts of solvents. Although "Butyl Carbitol" has been used in the preceding examples in the interests of uniformity, many solvents equally suitable will be obvious to one skilled in the art.

The required general characteristics of such a solvent is that it be a water-soluble, oxygen-containing organic material which is chemically inert to aliphatic $C_{12}$– to $C_{16}$ alcohols, water, and the alkyl ether sulfate salts of the present invention. Additionally, a solvent should be selected which will maintain the components of the air-foam liquid concentrate in solution at the temperature of anticipated use.

I have tested as solvents the water-soluble aliphatic alcohols containing from 1 to 5 carbon atoms, glycol-ethers ("Cellosolves" and "Carbitols") water-soluble ketones and esters and have found them all to be satisfactory. For example, I have formulated compositions of air-foam liquid concentrates of $C_{12}$–$C_{16}$ aliphatic alcohols and alkyl ether sulfate salts of the present invention, using the following materials as solvents: methanol, ethanol, isopropyl alcohol, 1-butanol, isobutanol, ethyl acetate, 2-pentanol, acetone, methyl ethyl ketone, diacetone alcohol, ethylene glycol monomethyl ether ("Methyl Cellosolve"), ethylene glycol monobutyl ether ("Butyl Cellosolve"), ethylene glycol monoethyl ether ("Cellosolve Solvent"), diethylene glycol monomethyl ether ("Methyl Carbitol"), diethylene glycol monoethyl ether ("Carbitol Solvent") and diethylene glycol monobutyl ether ("Butyl Carbitol").

All of the concentrates so prepared were clear and fluid at room temperature. Drainage tests on air foam generated, using these concentrates, showed similar superior drainage performance as hereinbefore described in the preceding tables and examples. Table XVI illustrates, for example, the drainage performance of air foams generated, using three air-foam liquid concentrates and air-foam solutions of the indicated compositions.

TABLE XVI.—DRAINAGE PERFORMANCE OF FOAMS PRODUCED USING VARIOUS SOLVENTS IN THE AIR-FOAM LIQUID CONCENTRATE

| | A. Solvent | | |
|---|---|---|---|
| | 1-Butanol | Acetone | Methyl Cellosolve |
| B. Composition of Air-Foam Liquid Concentrate: | | | |
| Wt. Percent Solvent | 16 | 15 | 18 |
| Wt. Percent of Triethanolamine Lauryl Ether Sulfate of Table VII | 24 | 24 | 23 |
| Wt. Percent Lauryl Alcohol | 4.8 | 4.8 | 4.6 |
| Water to make | Balance | Balance | Balance |
| C. Composition of Air-Foam Solution: | | | |
| Concentration of Solvent | 265/100 | 250/100 | 310/100 |
| Concentration of Triethanolamine Lauryl Ether Sulfate of Table VII | 400/100 | 400/100 | 400/100 |
| Concentration of Lauryl Alcohol | 80/100 | 80/100 | 80/100 |
| Water to make | Balance | Balance | Balance |
| D. Wt. of Foam at "t"=0 (grams) | 235 | 278 | 256 |
| E. Wt. Percent of Water Remaining in Foam at Time "t", "t" (min.): | | | |
| 4 | 96 | 96 | 95 |
| 7 | 84 | 85 | 84 |
| 10 | 71 | 70 | 71 |
| 15 | 54 | 53 | 54 |
| 30 | 32 | 33 | 32 |

The formulator, by the proper selection of solvents, has the further opportunity of preparing air-foam liquid concentrates which will be clear fluid and instantly available for use even if stored, pending use, at low temperatures, e.g., during the winter season, Table XVII, for example, shows the composition and "turbidity temperature" of several air-foam liquid concentrates containing lauryl ether sulfate salts of about 4 moles of ethylene oxide with one mole of "Lorol." Table XVIII illustrates that the aforementioned solvents are also useful in air-foam liquid concentrates containing alkyl ether sulfate of salts of lesser degrees of ethoxylation.

By the term "turbidity temperature," I mean the temperature below which solids will appear in the air-foam liquid concentrate, thereby changing the composition of the liquid phase of said concentrate.

TABLE XVII.—TURBIDITY TEMPERATURE OF AIR-FOAM LIQUID CONCENTRATES AND DRAINAGE PERFORMANCE OF FOAMS PRODUCED THEREFROM (EtO=about 4)

| | A. Solvent | | | |
|---|---|---|---|---|
| | Ethanol | Butyl Cellosolve | Methyl Ethyl Ketone | Butyl Carbitol |
| B. Composition of Air-Foam Liquid Concentrate: | | | | |
| Wt. Percent Solvent | 29 | 31 | 39 | 71 |
| Wt. Percent Ammonium Lauryl Ether Sulfate of Table I | | | | 7.6 |
| Wt. Percent of Triethanolamine Lauryl Ether Sulfate of Table VII | 20 | 19 | 17 | |
| Wt. Percent Lauryl Alcohol | 4.0 | 3.8 | 3.4 | 1.0 |
| Water to make | Balance | Balance | Balance | Balance |
| C. Turbidity Temperature of Air-Foam Liquid Concentrate, °F | 29 | 25 | 0 | −20 |
| D. Composition of Air-Foam Solution: | | | | |
| Concentration of Solvent, mg./ml | 575/100 | 650/100 | 915/100 | 3,740/100 |
| Concentration of Ammonium Lauryl Ether Sulfate of Table I, mg./ml | | | | 400/100 |
| Concentration of Triethanolamine Lauryl Ether Sulfate of Table VII, mg./ml | 400/100 | 400/100 | 400/100 | |
| Concentration of Lauryl Alcohol, mg./ml | 80/100 | 80/100 | 80/100 | 53/100 |
| Water to make | Balance | Balance | Balance | Balance |
| E. Wt. of Foam at "t"=0 (grams) | 286 | 243 | 594 | 194 |
| F. Wt. Percent of Water Remaining in Foam at Time "t", "t" (min.): | | | | |
| 4 | 95 | 95 | 92 | 83 |
| 7 | 82 | 83 | 82 | 60 |
| 10 | 69 | 68 | 79 | 47 |
| 15 | 52 | 50 | 52 | 39 |
| 30 | 29 | 39 | 27 | 21 |

TABLE XVIII.—TURBIDITY TEMPERATURE OF AIR-FOAM LIQUID CONCENTRATES AND DRAINAGE PERFORMANCE OF FOAMS PRODUCED THEREFROM (EtO=about 1)

| | A. Solvent | | | |
|---|---|---|---|---|
| | Ethyl Acetate | Methyl Ethyl Ketone | Isobutyl Alcohol | Butyl Carbitol |
| B. Composition of Air-Foam Liquid Concentrate: | | | | |
| Wt. Percent Solvent | 21 | 24 | 21 | 60 |
| Wt. Percent Ammonium Lauryl Ether Sulfate of Table XI | 20 | 19 | 20 | 7 |
| Wt. Percent Lauryl Alcohol | 3.8 | 3.7 | 3.8 | 2.1 |
| Water to make | Balance | Balance | Balance | Balance |
| C. Turbidity Temperature of Air-Foam Liquid Concentrate, °F | 55 | 30 | 20 | −2 |
| D. Composition of Air-Foam Solution: | | | | |
| Concentration of Solvent, mg./ml | 420/100 | 510/100 | 420/100 | 1,280/100 |
| Concentration of Ammonium Lauryl Ether Sulfate of Table XI, mg./ml | 400/100 | 400/100 | 400/100 | 150/100 |
| Concentration of Lauryl Alcohol, mg./ml | 76/100 | 80/100 | 76/100 | 45/100 |
| Water to make | Balance | Balance | Balance | Balance |
| E. Wt. Percent of Foam at "t"=0 (grams) | 207 | 284 | 269 | 295 |
| F. Wt. Percent of Water Remaining in Foam at time "t", "t" (min.): | | | | |
| 4 | 96 | 94 | 98 | 85 |
| 7 | 86 | 80 | 89 | 70 |
| 10 | 76 | 66 | 79 | 56 |
| 15 | 69 | 51 | 65 | 41 |
| 30 | 35 | 32 | 38 | 22 |

It will be observed from Table XVII that "Butyl Carbitol" was 71 percent, by weight, of the air-foam liquid concentrate containing ammonium lauryl ether sulfate and lauryl alcohol. It should be understood that high solvent concentrations are also useful in formulating air-foam liquid concentrates which contain alkyl ether sulfate salts of other than the ammonium salt.

Table XIX, illustrates, for example, the drainage performance of air foams produced, using air-foam liquid concentrates which contain high concentrations of solvent and alkyl ether sulfate salts other than the ammonium salt.

The proportion of air-foam liquid concentrate to soft water or hard water (to prepare air-foam solution) is not critical, being dependent upon the concentration of the alkyl ether sulfate salts and the $C_{12}$- to $C_{16}$ aliphatic alcohol in said concentrate and the degree of water-retentiveness, turbidity temperature, etc. desired for the particular application. Normally, I desire in the air-foam solution a concentration of alkyl ether sulfate salt of not less than about 100 mg./100 ml. (0.100 wt. percent) and a $C_{12}$–$C_{16}$ aliphatic alcohol concentration of not less than 15 mg./100 ml. (0.015 wt. percent). Table XX illustrates the effect on air foam drainage performance of succes- TABLE XIX.—DRAINAGE PERFORMANCE OF FOAMS PRODUCED USING HIGH SOLVENT CONCENTRATIONS IN AIR-FOAM LIQUID CONCENTRATES

| | In Soft Water | In Sea Water |
|---|---|---|
| A. Composition of Air-Foam Liquid Concentrate: | | |
| Wt. percent "Butyl Carbitol" | 60 | 60 |
| Wt percent Sodium Lauryl Ether Sulfate of Table IV | | 5 |
| Wt. percent Triethanolamine Lauryl Ether Sulfate of Table VII | 5 | |
| Wt. percent Lauryl Alcohol | 1.5 | 1.5 |
| Water to make | Balance | Balance |
| B. Composition of Air-Foam Solution: | | |
| Concentration of Solvent, mg./ml | 2,400/100 | 2,400/100 |
| Concentration of Sodium Lauryl Ether Sulfate of Table IV, mg./ml | | 200/100 |
| Concentration of Triethanolamine Lauryl Ether Sulfate of Table VII, | 200/100 | |
| Concentration of Lauryl Alcohol, mg./ml | 60/100 | 60/100 |
| Water to make | Balance | Balance |
| C. Wt. of Foam at "t"=0 (grams) | 407 | 371 |
| D. Wt. percent of Water Remaining in Foam at Time "t", "t" (min.): | | |
| 4 | 83 | 87 |
| 7 | 53 | 49 |
| 10 | 42 | 39 |
| 15 | 28 | 26 |
| 30 | 10 | 11 |

Many other solvents other than those specifically named will be apparent to one skilled in the art. Simple experimentation will determine a composition which will meet particular requirements. Thus, the formulator can employ my invention in a number of ways to achieve specific objectives, e.g., desired turbidity temperatures, various degrees of water-retentiveness in the air foam, various expansion ratios, etc.

In preparing the air-foam liquid concentrate, I prefer to first dissolve the $C_{12}$– to $C_{16}$ aliphatic alcohol in the solvent. This solution is then added (with stirring) to an aqueous concentrate of the alkyl ether sulfate salt to prepare the air-foam liquid concentrate. It should be understood that the air-foam concentrate can be formulated in other manners.

Operation

The compositions described, produce foam with either soft water or hard water having a hardness as high as sea water. Regardless of the type of water the operation is essentially the same. For high expansion foam generation air is aspirated into diluted foam-producing agent in the manner described in copending application Ser. No. 13,103.

sively decreasing the amount of air-foam liquid concentrate added to water to form the air-foam solution.

TABLE XX.—DRAINAGE PERFORMANCE OF FOAMS PRODUCED WITH AIR-FOAM SOLUTIONS CONTAINING DIFFERENT AMOUNTS OF AN AIR-FOAM LIQUID CONCENTRATE

| A. Composition of Air-Foam Liquid Concentrate: | | | |
|---|---|---|---|
| Wt. percent Butyl Carbitol | 19.5 | | |
| Wt. percent Ammonium Lauryl Ether Sulfate (see Table I) | 20.8 | | |
| Wt. percent Lauryl Alcohol | 3.1 | | |
| Water to make | Balance | | |

| | Air-Foam Solution | | |
|---|---|---|---|
| | A | B | C |
| B. Wt. of Air-Foam Liquid Concentrate Added to make 2 Quarts of Air-Foam Solution, grams | 36.2 | 18.1 | 9.05 |
| C. Composition of Air-Foam Solution: | | | |
| Concentration of Butyl Carbitol, mg./ml | 374/100 | 187/100 | 94/100 |
| Concentration of Ammonium Lauryl Ether Sulfate, mg./ml. | 400/100 | 200/100 | 100/100 |
| Concentration of Lauryl Alcohol, mg./ml | 60/100 | 30/100 | 15/100 |
| Water to make | Balance | Balance | Balance |
| D. Wt. of Foam at "t"=0 (grams) | 205 | 274 | 813 |
| E. Wt. percent of Water Remaining in Foam at Time "t", "t" (min.): | | | |
| 4 | 98 | 94 | 87 |
| 7 | 95 | 80 | 69 |
| 10 | 82 | 66 | 54 |
| 15 | 60 | 50 | 40 |
| 30 | 38 | 29 | 23 |

The air-foam solution is sprayed by nozzles onto a net which is wetted by said spray and a draft of air, either forced draft or natural draft, is then passed through the net and in passing through the net openings, the foam material is blown into light, billowy bubbles which have the necessary water content for smothering fires.

The foam material is generated by an air velocity of between about 80 feet per minute to about 600 feet per minute and the volume of foam which is produced is propelled forwardly of the net by the air stream which is used for forming the foam. The foam is urged to the site of the fire so that the foam-generating equipment can be located remotely from the fire and out of the direct vicinity of high heat and noxious fumes which prevent close-up fire fighting. Typically, I generate foam at the rate of about 1000 cubic feet per minute and therefore can fill very large spaces with the foam in a matter of a few moments.

The net, over which the solution is sprayed, can be inclined and is either planar or corrugated to prevent loss of the foam-generating material by drainage.

When the foam material reaches, and envelopes the fire, it will have retained sufficient water content to vaporize into steam which, in turn, is retained in the vicinity of the fire by the surrounding mass of bubbles and will therefore smother the fire by depriving the fire of the necessary amount of oxygen to support combustion. The foam also fights fire by another principle, namely by cutting down on the radiant energy of the fire. For example, in an oil-type fire, when combustion once starts the radiant energy serves to crack the hydrocarbon materials into lower more inflammable hydrocarbon content. The foam material, in addition to smothering the ignited portion of the oil, also cuts down on radiation of the fire because the fire is completely surrounded and the foam consequently prevents thermal cracking of the oil in the vicinity of the fire. In this way, the foam operates on two distinct principles, shielding and smothering, to bring under control this very difficult and unmanageable type of fire.

Another contemplated usage of my invention is in the field of decontamination. For example, in a certain area having radioactive particles dispersed in the atmosphere, it is possible to generate out of the fixed volume of atmosphere a large mass of bubbles. That is, the foam-generating equipment can be located within the fixed volume and proceeds to "capture" all of the contaminated atmosphere within bubble formations. For a period of time, as for example 25 minutes or so, all of the atmosphere is maintained in aspirated condition wth foam. The foam generator is kept operating to generate foam at the same rate it is broken down. The slight radioactive particles, some of which are very small, in the order of micron and submicron size will impinge the inner surface of the foam and being wetted, will be carried down with the drainage of the foam as it fractures into liquid phase and releases the inner air. During the 25 minute period or so, all of the radioactive particles will become wetted and will be carried down with the foam until it reaches the floor where it is washed away. From actual test experience, virtually all airborne radioactive material can be removed in the manner described by the foam material.

One of the important advantages of the foam which is generated in the present invention is that there is a sufficient oxygen content of the foam to permit breathing within an atmosphere of this foam material and therefore there is substantially less hazard presented to personnel in the vicinity of the fire. Also, since the foam material can be used with any source water, it is especially adapted for use on shipboards, docks, warehouses and the like which are in the vicinity of fresh or salt water.

The foam material is variable in size, ranging from emulsion size to much larger size making it light and billowy enough to permit ease of transport depending upon the apparatus used. The foam material also possesses a sufficient water content to effect smothering, but not so much as to produce damage to the area being treated. For example, a site filled with bubbles constituting my present invention is exposed to substantially less water than is the case where streams of water are sprayed within the site. In conventional systems the practice is to literally soak the entire area, so that as much damage from water is produced as by fire. Water damage is almost negligible in the present invention because of the slight moisture content in the bubbles as compared with water flow type of fire control. It should be understood however that there must be some minimal quantity of water in the bubbles otherwise, if they are too "dry" insufficient steam is generated to effect smothering of the fire. That, of course, is the reason for inclusion of the 10 to 20 carbon atom alcohol, to improve the water retentiveness of the bubbles so that they will retain a sufficient water content.

By reason of the present invention, which produces a foam-generating material suitable for use with either fresh or salt water or any range of hardness therebetween, it is possible to greatly increase the scope of usage of the apparatus disclosed in application Ser. No. 13,103, with all of its inherent versatility and important advantages by way of safer, quicker and less damage-producing fire control, thus adding importantly to the art of fire control.

While several specific compositions of the invention have been described, these are by way of illustration only, and not limitation, since other compositions will become apparent to those skilled in the art which are within the purview of the invention and within the scope of the appended claims.

I claim:

1. An air foam liquid concentrate for use with water having a hardness range from soft water to very hard water approaching the hardness of sea water for producing a water-retentive foam having an expansion ratio of about 50/1 to about 2000/1, said concentrate suitable for use in fire fighting and decontamination and producing a high expansion foam when diluted with water, which consists essentially of:

(a) water and a foaming agent of the formula

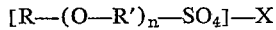

wherein R is an alkyl radical of from 10 to 20 carbon atoms, R' is selected from the class consisting of ethylene and propylene, X is a cation selected from the class consisting of alkali metals, alkaline earth metals, monoethanolamine, diethanolamine, triethanolamine and ammonium, and $n$ is 1 to 4, said foaming agent comprising about 5 to about 30% by weight of the liquid concentrate;

(b) at least one water drainage inhibiting additive selected from the class of lauryl alcohol, myristyl alcohol and cetyl alcohol, said water drainage inhibiting additive being present in said composition in an amount from about 5% to about 70% by weight of said alkyl ether sulfate salt; and (c) from 0 to about 71% by weight of a water soluble organic oxygen containing solvent which is chemically inert to the ingredients of said liquid concentrate and maintains them in solution.

2. A composition according to claim 1 wherein said solvent is present in said liquid concentrate in an amount from about 7% to about 71% by weight.

3. A composition according to claim 2 wherein said water drainage inhibiting additive is present in said composition in an amount from about 12.5 to about 30% by weight of said alkyl ether sulfate salt.

4. A composition according to claim 3 wherein R is selected from the class consisting of lauryl, myristyl and decyl radicals.

5. A composition according to claim 4 wherein R is lauryl, R' is ethylene, X is ammonium and said water drainage inhibiting additive is lauryl alcohol.

6. A composition according to claim 4 wherein R is lauryl, R' is ethylene, X is an alkali metal and said water drainage inhibiting additive is myristyl alcohol.

7. A composition according to claim 4 wherein R is lauryl, R' is ethylene, X is an alkaline earth metal and said water drainage inhibiting additive is lauryl alcohol.

8. A composition according to claim 3 wherein the solvent is a hydrocarbon alcohol of 1 to 5 carbon atoms, 9. A composition according to claim 3 wherein the solvent is selected from the group consisting of ethyl acetate, acetone, methyl ethyl ketone, diacetone alcohol, ethylene glycol monoethyl ether, ethylene glycol monobutyl ether and ethylene glycol monomethyl ether.

10. An air foam liquid concentrate for use with water having a hardness range from soft water to very hard water approaching the hardness of sea water for producing a water-retentive foam having an expansion ratio of about 50/1 to about 2000/1, said concentrate suitable for use in fire fighting and decontamination and producing a high expansion foam when diluted with water which consists essentially of:
(a) water and a foaming agent of the formula $$[R\!-\!(O\!-\!R')_n\!-\!SO_4]\!-\!X$$

wherein R is an alkyl radical of from 10 to 20 carbon atoms, R' is selected from the class consisting of ethylene and propylene, X is a cation selected from the class consisting of alkali metals, alkaline earth metals, monoethanolamine, diethanolamine, triethanolamine and ammonium, and $n$ is 1 to 4, said foaming agent comprising about 5 to about 30% by weight of the liquid concentrate; and
(b) at least one water drainage inhibiting additive selected from the class of lauryl alcohol, myristyl alcohol and cetyl alcohol, said stabilizing additive being present in said composition in an amount from about 12.5 to about 30% by weight of said alkyl ether sulfate salt.

11. A composition according to claim 10 wherein R is selected from the class consisting of lauryl, myristyl and decyl radicals.

12. A composition according to claim 11 wherein R is lauryl, R' is ethylene, X is ammonium and said water drainage inhibiting additive is lauryl alcohol.

13. A composition according to claim 11 wherein R is lauryl, R' is ethylene, X is an alkali metal and said water drainage inhibiting additive is myristyl alcohol.

14. A composition according to claim 11 wherein R is lauryl, R' is ethylene, X is an alkaline earth metal and said water drainage inhibiting additive is lauryl alcohol.

References Cited
UNITED STATES PATENTS

| | | | |
|---|---|---|---|
| 2,114,042 | 4/1938 | Bertsch | 252—3 |
| 2,165,997 | 7/1939 | Daimler | 252—3 |
| 2,770,600 | 11/1956 | Ricciardi | 252—161 XR |
| 2,772,239 | 11/1956 | Lewis et al. | 252—161 |
| 2,861,956 | 11/1958 | Fernandez | 252—89 |
| 2,879,231 | 6/1960 | Korpi et al. | 252—89 |
| 3,085,067 | 4/1963 | Anderson | 252—89 |
| 3,186,943 | 6/1965 | Barthauer | 252—3 |

OTHER REFERENCES

Journal of The American Oil Chemist Society, vol. 27, pp. 268–73 (1950), July.

MAYER WEINBLATT, Primary Examiner

U.S. Cl. X.R.

252—8.05, 307